(12) United States Patent
Doudement

(10) Patent No.: US 7,553,156 B2
(45) Date of Patent: Jun. 30, 2009

(54) FURNACE FOR HEATING A PREFORM, PROVIDED WITH TWO COOLING FANS

(75) Inventor: Christophe Doudement, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 269 days.

(21) Appl. No.: 10/583,540

(22) PCT Filed: Dec. 17, 2004

(86) PCT No.: PCT/EP2004/053581

§ 371 (c)(1),
(2), (4) Date: Aug. 24, 2006

(87) PCT Pub. No.: WO2005/065917

PCT Pub. Date: Jul. 21, 2005

(65) Prior Publication Data

US 2007/0148272 A1 Jun. 28, 2007

(30) Foreign Application Priority Data

Dec. 19, 2003 (FR) .................................. 03 51123

(51) Int. Cl.
*B29B 13/02* (2006.01)

(52) U.S. Cl. .................... 432/121; 432/202; 425/174.4; 425/526

(58) Field of Classification Search ................. 432/121, 432/201, 202, 224, 229; 264/454, 458, 520, 264/521, 535; 425/174.4, 526; 219/388, 219/405, 411
See application file for complete search history.

(56) References Cited

U.S. PATENT DOCUMENTS

| 6,361,301 | B1 * | 3/2002 | Scaglotti et al. | 425/174.4 |
| 6,632,087 | B1 * | 10/2003 | Armellin et al. | 432/202 |
| 6,888,103 | B2 * | 5/2005 | Vaughn et al. | 219/388 |
| 7,121,821 | B2 * | 10/2006 | Pickel | 425/174.4 |
| 2007/0085243 | A1 * | 4/2007 | Doudement | 264/521 |

FOREIGN PATENT DOCUMENTS

| WO | 01/34369 | 5/2001 |
| WO | 03/024693 | 3/2003 |

* cited by examiner

*Primary Examiner*—Gregory A Wilson
(74) *Attorney, Agent, or Firm*—Young & Thompson

(57) ABSTRACT

A furnace (22) for heating a preform (10), includes an upper longitudinal heating tunnel (24) bounded transversely by the longitudinal vertical internal faces (36, 38) of two walls (40, 42), one wall (40), being equipped with a heating system (46), and the other wall (42), having aeration orifices (50) intended to let the air blown by a blower (52) pass transversely through them, and in which one portion (16) of the preform (10) is held outside the heating tunnel (24), a blower (52) blowing air transversely towards the portion (16) of the preform (10) so as to keep the constituent material of this portion (16) of the preform (10) at a temperature below its softening point, characterized in that the blower (52) includes two independent fans (54a, 54b) that deliver air to the aerated wall (42) and to the portion (16) of the preform (10), respectively.

12 Claims, 2 Drawing Sheets

FURNACE FOR HEATING A PREFORM, PROVIDED WITH TWO COOLING FANS

BACKGROUND OF THE INVENTION

1. Field of the Invention

The invention relates to a furnace for heating a preform, especially a plastic container preform.

The invention relates more particularly to a furnace for heating a preform, especially a plastic container preform, which comprises a longitudinal heating tunnel bounded transversely by the mutually parallel longitudinal vertical internal faces of two walls, one a heating wall, being equipped with a heating system, and the other an aerated wall, having aeration orifices that are intended to let the air blown by a blower pass through them transversely from the upstream, outside the heating tunnel, to the downstream, inside the latter, and in which furnace a first portion of the preform is heated in the heating tunnel, while the second portion of the preform is held outside the heating tunnel through a longitudinal opening made between the longitudinal edges of the walls of the heating tunnel, the blower blowing air transversely to the second portion of the preform so as to keep the constituent material of this second portion of the preform at a temperature below its softening point.

2. Description of the Related Art

Plastic containers, and especially bottles, for example made of polyethylene terephthalate (PET), are generally produced from preforms that are shaped into bottles by an operation of blow or stretch-blow moulding of their body and their end wall. The preforms generally have the form of a test tube, the neck of which already has the final shape of the throat of the container to be produced. The neck has for example a thread intended to receive a screw stopper.

Before carrying out the blow moulding operation, it is necessary to heat the preforms in a heating furnace so as to soften the plastic. For this purpose, the constituent plastic of the preforms is heated to a temperature above its glass transition temperature.

Preform heating furnaces of the type having a longitudinal heating tunnel are already known. The cold preform is transported by a transport device from a first end of the tunnel and then travels along the tunnel, in which it is heated, before emerging via the second end of the tunnel. The preform thus heated is ready for the blow moulding operation.

To ensure depthwise heating of the end wall and the cylindrical wall of the body of the preform over its entire periphery, the preforms are generally rotated about themselves as they travel through the furnace. Moreover, one wall of the tunnel is equipped with radiation heating means, while the other wall is provided with aeration orifices for blown air to flow through so as to promote uniform heating throughout the thickness of the cylindrical wall of the body of the preform without overheating the layer of surface material forming the external face of the cylindrical wall of the preform.

In fact, the blown air removes the convective heat caused by the heating means, in order to promote penetration of the radiation that it produces in the thickness of the constituent material of the body.

However, the neck of the preform, which has its final shape and its final dimensions, must not be deformed during the heating and/or blow moulding operations. It is therefore essential to keep the neck at a temperature below the glass transition temperature. For this purpose, the neck of the preform is held outside the tunnel through an opening in the tunnel that forms a longitudinal slot.

To prevent the heat from the heating tunnel from being communicated to the neck of the preform, said neck is cooled by air blown by a blower.

It is known to equip furnaces with a single blower, which makes it possible, on the one hand, to distribute the heat uniformly in the heating tunnel and, on the other hand, to cool the neck of the preform. The blower is then equipped with a deflector, which is located upstream of the tunnel and of the preform relative to the flow direction of the air. The deflector thus deflects a portion of the stream of blown air on to the neck of the preform.

BRIEF SUMMARY OF THE INVENTION

The aim of the present invention is to improve the effectiveness with which the neck of the preform is cooled during the heating operation, while optimally keeping the surface layer of the body of the preform at a temperature close to the glass transition temperature of the plastic. For this purpose, the invention proposes an furnace of the type described above, characterized in that the blower comprises two independent fans that deliver air to the aerated wall and to the second portion of the preform held outside the heating tunnel, respectively.

According to other features of the invention:
- the delivery ducts are formed by the upper and lower compartments of a common box having a dividing partition;
- the blower includes two separate air inlet ducts that are each associated with a fan;
- the blower includes two coaxial vertical shafts, each driving an associated fan;
- the speed of the air stream expelled by the fan associated with the aerated wall is controlled by a control device; and
- the fans are controlled by two separate control units.

BRIEF DESCRIPTION OF THE DRAWING FIGURES

Other features and advantages of the invention will become apparent on reading the following detailed description, for the understanding of which the reader should refer to the appended drawings, in which.

DETAILED DESCRIPTION OF THE PREFERRED EMBODIMENTS

Figure 2:
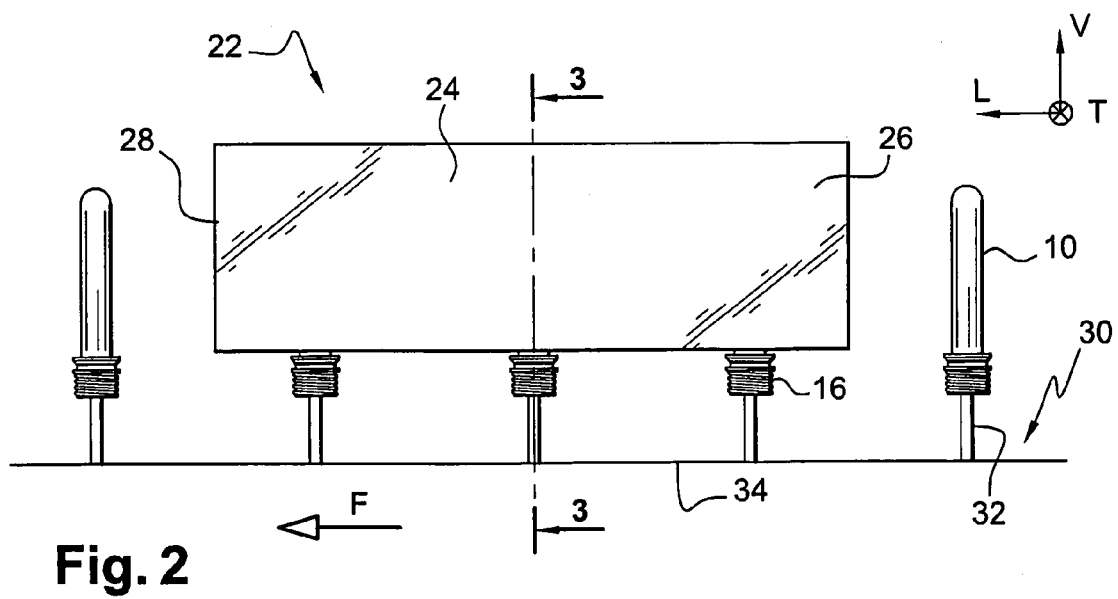
FIG. 2 is a side view showing an furnace for heating the preform of FIG. 1 and produced according to the teachings of the invention.

In the rest of the description, a longitudinal, vertical and transverse orientation, indicated by the (L,V,T) coordinate system shown in FIG. 2, will be adopted, but without being limited thereby.

In the rest of the description, an upstream-to-downstream orientation will be used to describe the flow of air.

The same references will also be used to denote identical, similar or analogous elements.

Figure 1:
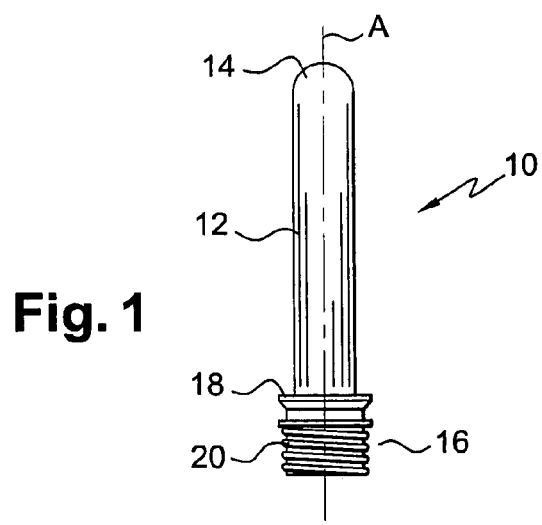
FIG. 1 is a side view showing a preform intended to be heated in a furnace before being converted into a container after a blow moulding operation.

FIG. 1 shows a preform 10 made of a plastic, such as polyethylene terephthalate (PET), which is intended to be converted into a plastic container after a first operation, in which it is heated to soften the plastic, and then a second operation, in which it is blow moulded in order to shape the preform 10 into a container.

The preform 10 has a test tube shape of vertical axis A. The tubular body 12 of the preform 10 is closed at its upper end by a hemispherical end wall 14, while its lower end includes a neck 16 that forms a throat.

The neck 16 already has the final shape of the throat of the finished container. Thus, to obtain a finished container, only the tubular body 12 and its end wall 14 have to be deformed by blow moulding. During the blow moulding operation, it is therefore important to heat only a first portion of the preform 10, comprising the tubular body 12 and the end wall 14, above the glass transition temperature of the plastic, while keeping the temperature of the neck 16, forming a second portion of the preform 10, below the glass transition temperature.

The neck 16 is bounded at the top by a flange 18. The external cylindrical face 20 of the neck here has a thread that is intended to receive a threaded stopper (not shown) so as to seal the container.

FIG. 2 shows an furnace 22 for heating the preform 10 during the heating operation. The furnace 22 comprises here a longitudinal heating tunnel 24 through which the preform 10 is intended to move along the direction indicated by the arrow F. The tunnel 24 has a first end 26 where the preform 10 enters, on the right in FIG. 2, and a second end 28 where the preform 10 leaves, on the left in FIG. 2.

As illustrated in FIG. 2, the furnace 22 includes a device 30 for transporting the preform 10 from the inlet 26 to the outlet 28 of the furnace 24. The transport device 30 comprises a train of mandrels 32 for gripping the preforms 10, these mandrels extending vertically upwards from a lower rail 34 which runs beneath the tunnel 24 so as to be parallel therewith. The mandrels 32 are intended to keep the preforms 10 vertical during their travel along the tunnel 24.

The rectilinear longitudinal shape of the tunnel 24 as shown in FIG. 2 is given by way of non-limiting example.

Figure 3:
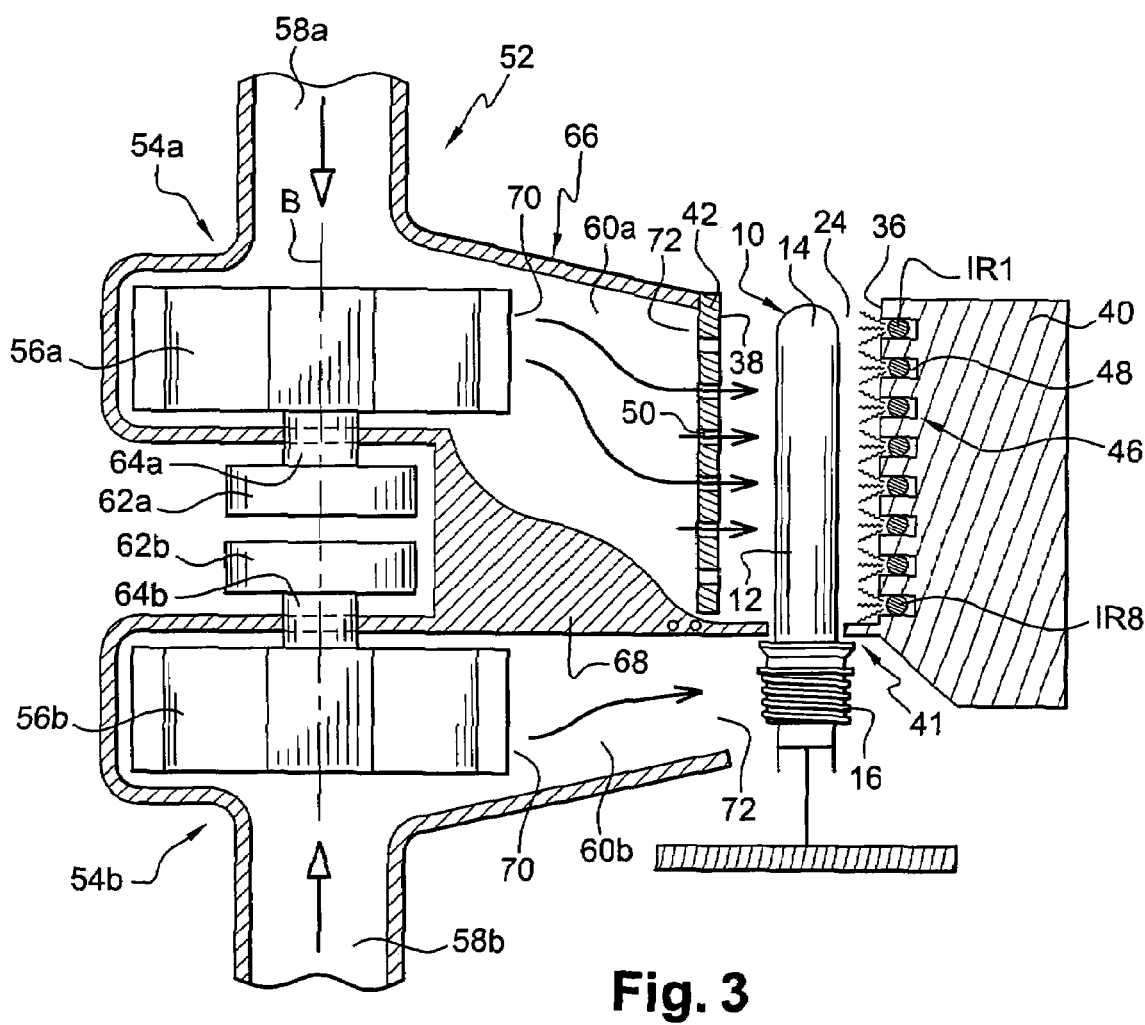
FIG. 3 is a cross-sectional view in the plane 3-3 of FIG. 2, showing the furnace equipped with a blower comprising two fans.

FIG. 3 shows a section of the tunnel 24. It is bounded transversely by two mutually parallel vertical longitudinal internal faces 36 and 38 belonging to a first wall 40, located on the right in FIG. 3, and to a second wall 42, located on the left, respectively.

The tunnel 24 here is closed neither at the top nor at the bottom. Thus, the lower longitudinal edges of the internal faces 36 and 38 define a lower opening 41 in the form of a longitudinal slot.

The first wall 40 is equipped with a heater 46 for heating the tunnel 24. In the example shown in FIG. 3, the heater 46 comprises eight infrared lamps, which here are referenced IR1 to IR8 and have the form of longitudinal tubes. The tubes IR1 to IR8 are held by each of their ends close to the internal face 36 of the first wall 40 using means, here vertically distributed longitudinal channels 48, each intended to house one end of the lamps IR1 to IR8.

The second wall 42 here includes orifices 50 that pass transversely through its thickness so as to allow a stream of air produced by a blower 52 to penetrate into the tunnel 24. As explained in the preamble, the stream of air thus cools the cylindrical wall of the preform 10.

As shown in FIG. 3, the tubular body 12 and the end wall 14 of the preform 10 are held inside the heating tunnel 24, while the neck 16 and the flange 18 are held outside the tunnel 24, passing through the lower opening 41.

To keep the neck 16 at a temperature below its glass transition temperature, a stream of fresh air is blown transversely towards the neck 16 by the blower 52.

The blower 52 is located transversely to the left of the second wall 42 in FIG. 3.

According to the teachings of the invention, the blower comprises two separate blowers, namely an upper blower 54a and a lower blower 54b. In the rest of the description, the references for the components of the upper fan 54a will be followed by the letter <<a>>, while the references for the components of the lower fan 54b will be followed by the letter <<b>>.

Each fan 54a and 54b mainly comprises a motor-driven bladed wheel 56a and 56b, also called a turbine, which is mounted so as to rotate about a vertical axis B, a vertical axial air inlet duct 58a, 58b and a transverse tangential air outlet or delivery duct 60a, 60b. The fans 54a and 54b are overall symmetrical with respect to a horizontal mid-plane, that is to say the bladed wheels 56a and 56b and the delivery ducts 60a and 60b are adjacent, while the inlet ducts 58a and 58b are oriented in the opposite direction.

The bladed wheels 56a and 56b are mounted so as to rotate about the same vertical axis B. They are each rotated by an associated motor 62a and 62b via a shaft 64a, 64b. The motors 62a and 62b here are placed vertically between the two bladed wheels 56a and 56b.

In an alternative embodiment (not shown) of the invention, the motors 62a and 62b are located some distance from the fans 54a and 54b and they drive the shafts 64a and 64b via movement transmission mechanisms, such as belts. The two bladed wheels 56a and 56b may thus be brought close to each other vertically so that the blower 52 is more compact height-wise.

The air inlet ducts 58a and 58b are placed vertically along the axis B of the bladed wheels 56a and 56b, one opposite the other.

Thus, the air inlet duct 58a of the upper fan 54a extends vertically above the bladed wheel 56a so as to take in air from above the blower 52 downwards into the bladed wheel 56a.

The air inlet duct 58b of the fan 54b extends vertically below the bladed wheel 56b so as to take in air from below the blower 52 upwards into the bladed wheel 56b.

The delivery ducts 60a and 60b are oriented transversely to the tunnel 24 and are adjacent to each other.

In the example shown in FIG. 3, they are formed in a common output box 66, which is divided into two compartments, an upper compartment 60a and a lower compartment 60b, by a horizontal partition 68 being substantially in the plane of symmetry of the two fans 54a and 54b. The first, upstream transverse end 70 of the box 66, located on the left and at the outlet of the bladed wheels 56a and 56b with regard to FIG. 3, and the second, downstream transverse end 72 include openings so as to let a stream of air flow transversely from the bladed wheels 56a and 56b into the tunnel 24 and the neck 16 respectively.

The upper compartment 60a thus forms a delivery duct that extends transversely from the bladed wheel 56a to the second wall 42 of the heating tunnel 24.

The lower compartment 60b thus forms a delivery duct that extends transversely from the lower bladed wheel 56b into the region of the neck 16 of the preform 10.

Advantageously, the motors 62a and 62b are controlled by two separate control units. It is thus possible to regulate the stream of air passing through the second wall 42 by acting on the upper fan 54a, without modifying the stream of air needed to cool the neck 16.

During operation of the blower 62, the motors 62a and 62b rotate the bladed wheels 56a and 56b which induct air via the axial inlet ducts 58a and 58b as shown by the arrows in FIG. 3.

The upper bladed wheel 56*a* blows the air, thus inducted, into the upper delivery duct 60*a*. The delivered air passes through the orifices 50 of the second wall 42 so as to penetrate into the tunnel 24.

The lower bladed wheel 56*b* blows the air, thus inducted, into the lower delivery duct 60*b*. The delivered air is directed directly on to the neck 16 so as to cool the latter.

According to an alternative embodiment (not shown) of the invention, the inlet duct 58*b* of the lower fan 54*b* is contained coaxially inside the inlet duct 58*a* of the upper fan 54*a*. The downstream end section of the inlet duct is extended downwards through a vertical recess reserved in the axis of the hub of the upper bladed wheel 56*a*, and then the air thus flowing through the hub is inducted by the lower bladed wheel 56*b* before being delivered into the lower delivery duct 60*b*. Advantageously, this configuration prevents the lower fan 54*b* from sucking up elements likely to be beneath the furnace 22, for example dust on the floor beneath the furnace 22.

The invention claimed is:

1. A furnace (22) for heating a preform (10), which comprises:
    a longitudinal heating tunnel (24) bounded transversely by mutually parallel longitudinal vertical internal faces (36, 38) of two walls (40, 42), one a heating wall (40), being equipped with a heating system (46), and the other an aerated wall (42), having aeration orifices (50), and in the heating tunnel (24), a first portion (12, 14) of the preform (10) is heated, while a second portion (16) of the preform (10) is held outside the heating tunnel (24) through a longitudinal opening (41) made between longitudinal edges of the walls (40, 42) of the heating tunnel (24); a blower (52) which includes a first fan (54*a*) and a second fan (54*b*)
    said first fan (54*a*) delivers a first air stream transversely in a first delivery duct (60*a*) from an upstream, outside the heating tunnel (24), to a downstream, inside the latter, in a direction of the first portion (12, 14) of the preform (10), by passing through the aerated wall (42);
    said second fan (54*b*) delivers a second air stream transversely which is parallel to the first air stream, in a second delivery duct (60*b*) from the upstream, outside the heating tunnel (24), to the downstream, directly to the second portion (16) of the preform (10), so as to keep the constituent material of this second portion (16) of the preform (10) at a temperature below its softening point; and
    the two separate air delivery ducts (60*a*, 60*b*) being adjacent and formed by the upper and lower compartments of a common box (66) having a dividing partition (68).

2. The furnace (22) according to claim 1, wherein the blower (52) includes two separate air inlet ducts (58*a*, 58*b*) that are each associated with the fan (54*a*, 54*b*).

3. The furnace (22) according to claim 2, wherein the blower (52) includes two coaxial vertical shafts (64*a*, 64*b*), each driving the associated fan (54*a*, 54*b*).

4. The furnace (22) according to claim 1, wherein the speed of the air stream expelled by the fan (54*a*) associated with the aerated wall (42) is controlled by a control device.

5. The furnace (22) according to claim 1, wherein the fans (54*a*, 54*b*) are controlled by two separate control units.

6. The furnace (22) according to claim 1, wherein the blower (52) includes two separate air inlet ducts (58*a*, 58*b*) that are each associated with a fan (54*a*, 54*b*).

7. The furnace (22) according to claim 1, wherein the preform (10) has a test tube shape and includes a neck that forms a throat.

8. The furnace (22) according to claim 1, wherein the preform (10) is formed from plastic.

9. The furnace (22) according to claim 8, wherein the plastic is polyethylene terephthalate.

10. The furnace (22) according to claim 1, wherein the heating system (46) comprises a plurality of infrared lamps.

11. The furnace (22) according to claim 1, wherein the heating system (46) comprises eight infrared lamps set in the longitudinal vertical internal face (36), each infrared lamp having a longitudinal shape.

12. The furnace (22) according to claim 1, wherein the first fan (54*a*) and the second fan (54*b*) are symmetrical about a horizontal mid-plane, and both the first fan (54*a*) and the second fan (54*b*) rotate about a vertical axis.

* * * * *